United States Patent
Skowronski et al.

(10) Patent No.: US 6,170,251 B1
(45) Date of Patent: Jan. 9, 2001

(54) SINGLE SHAFT MICROTURBINE POWER GENERATING SYSTEM INCLUDING TURBOCOMPRESSOR AND AUXILIARY RECUPERATOR

(76) Inventors: Mark J. Skowronski, 12165 Glines Ct., Tustin, CA (US) 92782; Tony Prophet, 7420 Elena Dr. NE., Albuquerque, NM (US) 87113

(*) Notice: Under 35 U.S.C. 154(b), the term of this patent shall be extended for 0 days.

(21) Appl. No.: 08/993,331

(22) Filed: Dec. 19, 1997

(51) Int. Cl.[7] ............................... F02C 7/00; F02C 7/10; F02C 6/08
(52) U.S. Cl. ................. 60/39.02; 60/39.07; 60/39.511
(58) Field of Search .................... 60/39.06, 39.142, 60/39.141, 723, 39.07, 39.511

(56) References Cited

U.S. PATENT DOCUMENTS

| | | |
|---|---|---|
| 2,526,103 | 10/1950 | Wood . |
| 2,532,035 | 11/1950 | Pfenninger . |
| 2,618,431 | 11/1952 | Walker . |
| 2,741,422 | 4/1956 | Kockritz . |
| 3,659,417 | 5/1972 | Grieb . |
| 3,969,892 * | 7/1976 | Stettler et al. ................ 60/39.511 |
| 3,976,399 * | 8/1976 | Schmoch .................... 416/201 R |
| 4,091,613 | 5/1978 | Young . |
| 4,202,168 * | 5/1980 | Acheson et al. ................ 60/39.06 |
| 4,312,179 * | 1/1982 | Zaugg ......................... 60/39.142 |
| 4,380,893 | 4/1983 | Stokes . |
| 4,428,194 | 1/1984 | Stokes . |
| 4,858,428 * | 8/1989 | Paul .............................. 60/39.511 |
| 4,916,893 | 4/1990 | Rodgers . |
| 5,181,376 * | 1/1993 | Rao ................................ 60/39.06 |
| 5,511,374 | 4/1996 | Glickstein . |
| 5,586,429 | 12/1996 | Kesseli . |
| 5,855,112 * | 1/1999 | Bannai et al. ................. 60/39.511 |
| 5,918,458 * | 7/1999 | Coffinberry et al. ............ 60/39.07 |

FOREIGN PATENT DOCUMENTS

| | | |
|---|---|---|
| 2064060 | 7/1996 | (RU) . |
| 97/09524 * | 3/1997 | (WO) . |

* cited by examiner

*Primary Examiner*—Ted Kim
(74) *Attorney, Agent, or Firm*—Ephraim Starr; John R. Rafter

(57) ABSTRACT

A microturbine power generating system includes a primary compressor, an electrical generator and a turbine that can be rotated as a unit. Hot, expanding gases resulting from combustion are expanded through the turbine, and the resulting turbine power is used for powering the electrical generator. The microturbine power generating system further includes an auxiliary compressor that is driven by the turbine power. During operation of the system, a small portion of air can be bled off the primary compressor and further compressed in the auxiliary compressor to provide an auxiliary supply of pressurized air. The heat of high pressure compression is recovered to increase the overall efficiency of the machine.

9 Claims, 2 Drawing Sheets

SINGLE SHAFT MICROTURBINE POWER GENERATING SYSTEM INCLUDING TURBOCOMPRESSOR AND AUXILIARY RECUPERATOR

BACKGROUND OF THE INVENTION

The present invention relates generally to microturbine power generating systems. More specifically, the present invention relates to modular, distributed power generating units and how these units can be modified in a novel manner to produce a second value stream, i.e., compressed air.

The United States Electric Power Research Institute (EPRI) which is the uniform research facility for domestic electric utilities, predicts that up to 40% of all new generation could be provided by distributed generators by the year 2006. In many parts of the world, the lack of electric infrastructure (transmission and distribution lines) will greatly expedite the commercialization of distributed generation technologies since central plants not only cost more per kilowatt, but also must have expensive infrastructure installed to deliver the product to the consumer.

Small, multi-fuel, modular distributed microturbine generation units could help alleviate current afternoon "brownouts" and "blackouts" prevalent in many parts of the world. A simple, single moving part concept would allow for low technical skill maintenance and low overall cost would allow for wide spread purchase in those parts of the world where capital is sparse. In addition, given the United States emphasis on electric deregulation and the world trend in this direction, consumers of electricity would have not only the right to choose the correct method of electric service but also a new cost effective choice from which to chose. U.S. Pat. No. 4,754,607, which is assigned to the assignee of the present invention, discloses a microturbine power generating system suitable for cogeneration applications.

The microturbine generation units generate mechanical shaft work, which is used to generate electrical power. However, some of the mechanical shaft work is unused and, therefore, wasted.

SUMMARY OF THE INVENTION

The present invention makes use of some of the mechanical shaft work and heat used to produce compressed air in a Brayton cycle. The invention can be regarded as a microturbine power generating system including a primary compressor, an electrical generator and a turbine that can be rotated as a unit. Hot, expanding gases resulting from combustion are expanded through the turbine, and the resulting turbine power is used for powering the electrical generator.

The microturbine power generating system further includes an auxiliary compressor that is driven by the turbine power. During operation of the system, a small portion of air can be bled off the primary compressor and further compressed by the auxiliary compressor to provide an auxiliary supply of cooled pressurized air. The heat produced by generating the auxiliary compressed air is partially recovered in a novel manner to increase the overall machine efficiency.

DESCRIPTION OF THE PREFERRED EMBODIMENT

Figure 1:
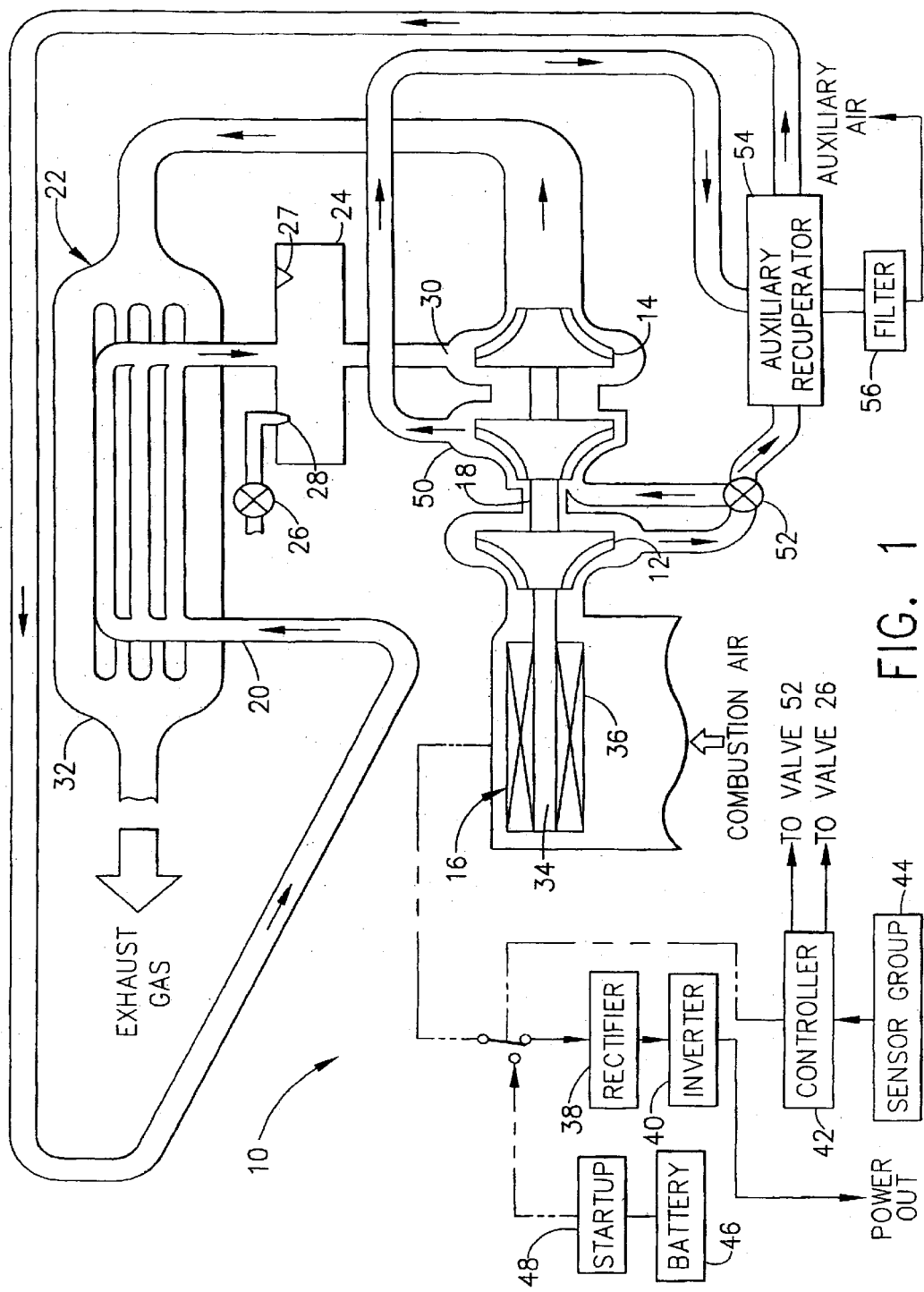
FIG. 1 is an illustration of a power generating system according to the present invention.

Referring to FIG. 1, a power generating system 10 according to the present invention is illustrated. The power generating system 10 includes a primary compressor 12, a turbine 14 and an electrical generator 16. The electrical generator 16 is cantilevered from the compressor 16. The primary compressor 12, the turbine 14 and the electrical generator 16 can be rotated by a single shaft 18. Although the primary compressor 12, turbine 14 and electrical generator 16 can be mounted to separate shafts, the use of a single common shaft 18 for rotating the primary compressor 12, the turbine 14 and the electrical generator 16 adds to the compactness and reliability of the power generating system 10.

The shaft 18 can be supported by self-pressurized air bearings such as foil bearings. The foil bearings eliminate the need for a separate bearing lubrication system and reduce the occurrence of maintenance servicing.

Air entering an inlet of the primary compressor 12 is compressed. Compressed air leaving an outlet of the primary compressor 12 is circulated through cold side passages 20 in a cold side of a primary recuperator 22. In the primary recuperator 22, the compressed air absorbs heat, which enhances combustion. The heated, compressed air leaving the cold side of the primary recuperator 22 is supplied to a combustor 24.

Fuel is also supplied to the combustor 24. Both gaseous and liquid fuels can be used. Any suitable gaseous fuel can be used. Choices of fuel include diesel, flair gas, off gas, gasoline, naphtha, propane, JP-8, methane, natural gas and other man-made gases.

The flow of fuel is controlled by a flow control valve 26. The fuel is injected into the combustor 24 by an injection nozzle 28.

Inside the combustor 24 the fuel and compressed air are mixed and ignited by an igniter 27 in an exothermic reaction. In the preferred embodiment, the combustor 24 contains a suitable catalyst capable of combusting the compressed, high temperature, fuel-air mixture at the process conditions. Some known catalysts usable in the combustor 24 include platinum, palladium, as well as metal oxide catalyst with active nickel and cobalt elements.

After combustion, a hot, expanding gas resulting from the combustion is directed to an inlet nozzle 30 of the turbine 14. The inlet nozzle 30 has a fixed geometry. The hot, expanding gas resulting from the combustion is expanded through the turbine 14, thereby creating turbine power. The turbine power, in turn, drives the primary compressor 12 and the electrical generator 16.

The turbine power also drives an auxiliary compressor 50. The auxiliary compressor 50 compresses a portion of the pressurized air bled off the primary compressor 12. The flow of the pressurized air to the auxiliary compressor 50 is controlled by a bleed valve 52. Air leaving the auxiliary compressor 50 is supplied to the hot side of an auxiliary recuperator 54, which recovers heat of compression from the air leaving the auxiliary compressor 50 and returns the heat to the air entering the primary compressor 12. The air leaving the hot side of the auxiliary recuperator 54 can be filtered and dried by a filter 56. An outlet of the filter 56 provides auxiliary or service air.

The shaft 18 places a turbine wheel of the turbine 14, the rotor 34 of the electrical generator 16, an impeller of the primary compressor 12, and an impeller of the auxiliary compressor 50 in a prestressed relation to allow rotation of the turbine wheel, the rotor 34 and the impellers as a single unit.

Turbine exhaust gas is circulated by hot side passages 32 in a hot side of the primary recuperator 22. Inside the primary recuperator 22, heat from the turbine exhaust gas on the hot side is transferred to the compressed air on the cold side. In this manner, some heat of combustion is recuperated and used to raise the temperature of the compressed air en route to the combustor 24. After surrendering part of its heat, the gas exits the primary recuperator 22. Additional heat recovery stages could be added onto the power generating system 10.

The generator 16 can be a ring-wound, two-pole toothless (TPTL) brushless permanent magnet machine having a permanent magnet rotor 34 and stator windings 36. The turbine power generated by the rotating turbine 14 is used to rotate the rotor 34. The rotor 34 is attached to the shaft 18. When the rotor 34 is rotated by the turbine power, an alternating current is induced in the stator windings 36. Speed of the turbine 34 can be varied in accordance with external energy demands placed on the system 10. Variations in the turbine speed will produce a variation in the frequency of the alternating current (i.e., wild frequencies) generated by the electrical generator 16. Regardless of the frequency of the ac power generated by the electrical generator 16, the ac power can be rectified to dc power by a rectifier 38, and then chopped by a solid-state electronic inverter 40 to produce ac power having a fixed frequency. Accordingly, when less power is required, the turbine speed can be reduced without affecting the frequency of the ac output.

Moreover, reducing the turbine speed reduces the airflow because the compressor runs slower. Consequently, the turbine inlet temperature remains essentially constant, thus maintaining a high efficiency at part load.

Use of the rectifier 38 and the inverter 40 allows for wide flexibility in determining the electric utility service to be provided by the power generating system of the present invention. Because any inverter 40 can be selected, frequency of the ac power can be selected by the consumer. If there is a direct use for ac power at wild frequencies, the rectifier 38 and inverter 40 can be eliminated.

The power generating system 10 can also include a battery 46 for providing additional storage and backup power. When used in combination with the inverter 40, the combination can provide uninterruptible power for hours after generator failure.

During operation of the power generating system 10, heat is generated in the electrical generator 16 due to inefficiencies in generator design. In order to extend the life of the electrical generator 16, as well as to capture useful heat, compressor inlet air flows over the generator 16 and absorbs excess heat from the generator 16. The rectifier 38 and the inverter 40 can also be placed in the air stream. After the air has absorbed heat from the aforementioned sources, it is compressed in the primary compressor 12 and further preheated in the primary recuperator 22.

A controller 42 controls the turbine speed by controlling the amount of fuel flowing to the combustor 24. The controller 42 uses sensor signals generated by a sensor group 44 to determine the external demands upon the power generating system 10. The sensor group 44 could include sensors such as position sensors, turbine speed sensors and various temperature and pressure sensors for measuring operating temperatures and pressures in the system 10. Using the aforementioned sensors, the controller 42 controls both startup and optimal performance during steady state operation. The controller 42 also controls the bleed valve 52, opening the bleed valve 52 when auxiliary or service air is desired. The controller 42 can also determine the state of direct current storage in the battery 46, and adjust operations to maintain conditions of net charge, net drain, and constant charge of the battery.

A switch/starter control 48 can be provided offskid to start the power generating system 10. Rotation of the compressor 12 can be started by using the generator 16 as a motor. During startup, the switch/starter control 48 supplies an excitation current to the stator windings 34 of the electrical generator 16. Startup power is supplied by the battery 46. In the alternative, a compressed air device could be used to motor the power generating system 10.

The power generating system 10 operates on a conventional recuperated Brayton cycle. The Brayton cycle can be operated on a relatively low pressure ratio (e.g., 3.8) to maximize overall efficiency; since, in recuperated cycles, the lower the pressure ratio, the closer the turbine exhaust temperature is to the inlet temperature. This allows heat addition to the cycle at high temperature and, in accordance with the law of Carnot, reduces the entropic losses associated with supplying heat to the cycle. This high temperature heat addition results in an increased overall cycle efficiency. The recovery of heat from the primary compression also increases overall efficiency.

The values that follow are provided merely by way of example. Air is compressed in a single stage radial compressor to 3.8 bars. The compressed air can be directed to the primary recuperator 22 where the temperature of the compressed air is increased using the waste heat of the turbine exhaust gas. The temperature of the exhaust gas from the turbine is limited to about 1,300° F. in order to help extend the life of the primary recuperator 22. For exhaust gas temperatures above 1,300° F., the primary recuperator 22 can be made of super alloys instead of stainless steel. The primary recuperator 22 can be designed for either 85% or 90% effectiveness depending on the economic needs of the customer. In the most efficient configuration, and using the 90% recuperation, the overall net cycle efficiency is 30%, yielding a high heating value heat rate of approximately 11,900 BTU/kWh on diesel.

After being heated in the recuperator 22, the compressed air is directed to the combustor 24, where additional heat is added to raise the temperature of the compressed air to 1,650° F. A combustor 24 designed according to a conventional design can yield a Nox level of less than 25 ppm, and a combustor 24 using a catalyst can yield a Nox rate that is virtually undetectable (commercial Nox sensors are limited to a 2 to 3 ppm detection range). The high enthalpic gas is then expanded through the turbine 14. The primary compressor 12, auxiliary compressor 50, turbine 14, the rotor 34, and the shaft 18—the only moving parts in the engine core of the system—spin as a single unit at high speeds of approximately typically in the range of 60,000 to 80,000 rpm or more. The resulting generator output frequency of around 1,200 hertz is then reduced by the inverter 38 to a grid-compatible 50 or 60 cycles. Resulting is a high power density typified by low weight (about a third of the size of a comparable diesel generator) and a small footprint (for example, approximately 3 feet by 5 feet by 6 feet high).

In the meantime, a portion of air leaving the primary compressor 12 is further pressurized by the auxiliary compressor 50. Leaving the auxiliary compressor 50 is air pressurized at approximately 100 psig. The air leaving the auxiliary compressor 50 can be filtered, dried and cooled as necessary. Heat of compression removed by the auxiliary recuperator 54 is transferred to the air entering the inlet of the primary compressor 12.

The high power density and low weight of the system 10 is made possible through the high speed components which permits large amounts of power using a minimum of material. The unit is completely self-contained in a weather proof enclosure. The power generating system 10 is "plug and play," requiring little more than a supply of clean fuel, liquid or gas.

Thus disclosed is a power generating system 10 that uses shaft power primarily for generating electricity, but also makes use of available shaft power to provide an auxiliary air supply. The auxiliary air supply can be used for many different types of applications, such as providing service and instrument air. Additionally, heat from the auxiliary air supply is recuperated and advantageously returned to the system 10.

The power generating system 10 can use multiple fuels including natural gas, diesel and JP-8. The power generating system 10 has a low thermal signature and minimal noise generation. The use of air bearings eliminates the need for an oil-based lubrication system. The electrical generation system 10 has high reliability and minimal service requirements due to single moving part design. The use of a solid-state electronic inverter 40 allows the system 10 to provide a variable ac output. Installation is easy due to a modular and self-contained design, and servicing is easy because the system 10 has one moving part and major parts that are easily accessible. The width, length and height of the system enclosure can be adjusted to fit a wide variety of dimensional requirements.

The power generating system 10 is smaller, lighter, more fuel-efficient and has lower thermal signature, noise, maintenance and cost penalties than comparable internal combustion engines. Therefore, due to its low installation costs, high efficiency, high reliability and simple, low cost maintenance, the power generating system 10 provides lower operating and fixed costs than power generators of comparable size.

Figure 2:
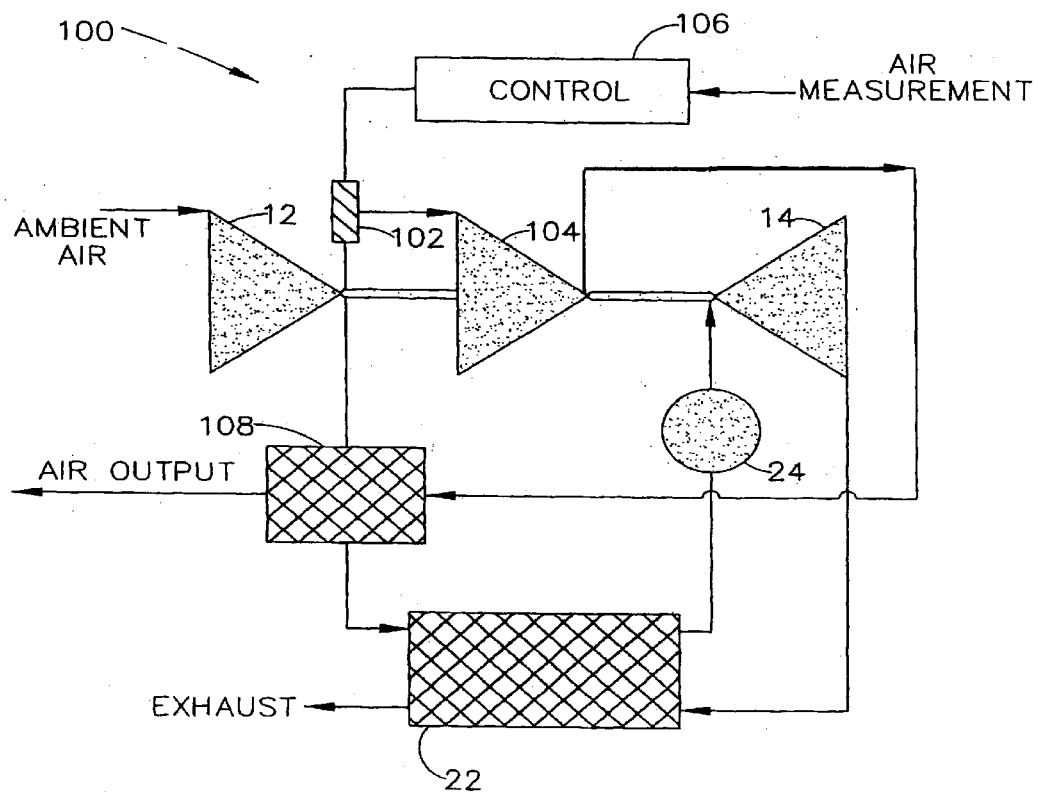
FIG. 2 is an illustration of an alternative embodiment of the power generating system.

The invention is not limited to the specific embodiment shown in FIG. 1. For example, FIG. 2 shows those components of a microturbine power generation system 100 including guide vanes 102 at the inlet of the auxiliary compressor 104 for optimizing air flow requirements at part-load operation and thereby optimizing system performance. The inlet guide vane 102 is located upstream the auxiliary compressor 104. The guide vanes 102 are controlled by a control 106 using a feedback control loop or a feedforward control loop. The feedback control loop uses output air requirements to control the flow of air into the auxiliary compressor 104, and the feedforward loop uses the air requirements of the turbine 14 to control the flow of air into the auxiliary compressor 104.

An auxiliary recuperator 108 recovers heat of compression from the air leaving the auxiliary compressor 104, the heat being recovered prior to compression in the auxiliary compressor 104. Heat recovered from the auxiliary recuperator 108 is returned to the primary recuperator 22.

Another example of departing from the specific embodiment shown in FIG. 1 includes adding one or more additional compressor wheels to the rotating group in order to increase the pressure of the auxiliary air supply or to provide additional (isolated) sources of pressurized air. Yet another example includes replacing the electrical generator 16 with the auxiliary compressor(s), whereby the system 10 would not generate electricity. Therefore, the present invention is not limited to the specific embodiment above, but instead is construed according to the claims that follow.

What is claimed is:

1. A microturbine power generating system for producing power comprising:

a primary compressor for providing pressurized air during operation of the system;

an auxiliary compressor for further compressing a portion of pressurized air bled off the primary compressor and supplying auxiliary air;

means operably associated with said microturbine power generating system for combusting a mixture of fuel and a second portion of pressurized air from the primary compressor, thereby producing gaseous heat energy;

an auxiliary recuperator for recovering heat from air compressed in the auxiliary compressor and supplying at least some of said heat to said second portion of pressurized air;

a turbine for converting said gaseous heat energy into mechanical work, the mechanical work being used to drive the primary and auxiliary compressors; and a single gearless shaft connecting the turbine, the primary compressor and the auxiliary compressor in prestressed relation to allow the primary and auxiliary compressors to rotate in unison with the turbine and to thereby use the mechanical energy extracted by the turbine.

2. The system of claim 1, further comprising an electrical generator including a rotor, the rotor being coupled in prestressed relation with the turbine and the primary and auxiliary compressors on the shaft to allow the rotor to rotate in unison with the turbine and to thereby use the mechanical energy extracted by the turbine.

3. The system of claim 1, wherein the heat that is recovered following compression in the auxiliary compressor is added to said second portion of pressurized air used in said combustion means.

4. The system of claim 1, further comprising means for filtering the air leaving the auxiliary compressor.

5. The microturbine power generating system of claim 1, wherein said means for producing gaseous heat energy includes a low NOx combustor; the turbine receiving hot products of combustion from said combustor.

6. The system of claim 1, further comprising a guide vane for controlling the flow of bleed air into the auxiliary compressor.

7. A method of providing an auxiliary supply of air in a microturbine power generation system including a combustor, a single, gearless shaft connecting each of a turbine, a primary compressor and an auxiliary compressor in fixed relation, the method comprising the steps of:

using the primary compressor to pressurize incoming air;

supplying pressurized air leaving the primary compressor to the combustor;

bleeding off a portion of the pressurized air leaving the primary compressor;

further pressuring the air bled off the primary compressor in the auxiliary compressor;

recovering heat from air compressed in the auxiliary compressor and supplying said heat to the pressurized air en route to the combustor; and using the further pressurized air for the auxiliary supply.

8. A method of providing an auxiliary supply of air in a microturbine power generation system including a turbine, a primary compressor, an auxiliary compressor, means operably associated with said microturbine power generating system for producing gaseous heat energy, and a single rotatable gearless shaft connecting each of said turbine, said primary compressor and said auxiliary compressor in fixed relation, the method comprising the steps of:

using said primary compressor to pressurize incoming air;

supplying at least a portion of the pressurized air leaving said primary compressor to said means for producing gaseous heat energy;

supplying at least a portion of said gaseous heat energy to drive said turbine;

supplying at least another portion of the pressurized air leaving said primary compressor to said auxiliary compressor;

further pressurizing the air from said primary compressor in the auxiliary compressor;

supplying an auxiliary recuperator having a hot side flow path in thermal communication with a cold side flow path;

passing through the hot side flow path the air from the auxiliary compressor;

passing through the cold side flow path the portion of the pressurized air leaving said primary compressor en route to said means for producing gaseous heat energy, thereby recovering heat from air compressed in the auxiliary compressor; and using the further pressurized air for the auxiliary supply.

9. A method of providing an auxiliary supply of air in a microturbine power generation system as in claim 8, further comprising, prior to the step of using the pressurized air for the auxiliary supply, filtering the pressurized air for the auxiliary supply.

* * * * *